US009667717B2

(12) United States Patent
Hoffman et al.

(10) Patent No.: US 9,667,717 B2
(45) Date of Patent: May 30, 2017

(54) PERSONAL DIGITAL SERVER (PDS)

(71) Applicants: James Hoffman, Woodstock, NY (US); James Friskel, Rockledge, FL (US)

(72) Inventors: James Hoffman, Woodstock, NY (US); James Friskel, Rockledge, FL (US)

(*) Notice: Subject to any disclaimer, the term of this patent is extended or adjusted under 35 U.S.C. 154(b) by 0 days.

(21) Appl. No.: 14/512,982

(22) Filed: Oct. 13, 2014

(65) Prior Publication Data
US 2015/0032796 A1 Jan. 29, 2015

Related U.S. Application Data

(62) Division of application No. 12/709,933, filed on Feb. 22, 2010, now Pat. No. 8,862,894, which is a division of application No. 10/499,793, filed as application No. PCT/US02/41403 on Dec. 24, 2002, now abandoned.

(60) Provisional application No. 60/344,066, filed on Dec. 28, 2001.

(51) Int. Cl.
*H04L 29/08* (2006.01)
*H04L 29/06* (2006.01)
*G06F 21/62* (2013.01)

(52) U.S. Cl.
CPC ...... *H04L 67/1091* (2013.01); *G06F 21/6218* (2013.01); *H04L 63/0428* (2013.01); *H04L 63/08* (2013.01); *H04L 63/101* (2013.01); *H04L 63/104* (2013.01); *H04L 67/104* (2013.01); *H04L 67/1068* (2013.01); *H04L 67/16* (2013.01); *H04L 67/2823* (2013.01); *H04L 67/42* (2013.01); *H04L 67/1093* (2013.01); *H04L 2463/101* (2013.01); *Y10S 705/908* (2013.01)

(58) Field of Classification Search
CPC ........... G06F 21/6218; G06F 17/30206; G06F 17/30209; H04L 63/0428; H04L 63/08; H04L 63/101; H04L 63/104; H04L 67/42; H04L 67/1068; H04L 67/1091; H04L 67/16; H04L 67/2823; H04L 67/104; H04L 2463/101; H04L 67/1093; H04L 67/1042
USPC ...... 713/189; 726/3–4, 28–29; 709/202–205, 709/217, 225
See application file for complete search history.

(56) References Cited

U.S. PATENT DOCUMENTS

| 5,583,561 A | 12/1996 | Baker et al. |
|---|---|---|
| 5,588,061 A | 12/1996 | Ganesan et al. |
| 5,748,735 A | 5/1998 | Ganesan |
| 5,765,152 A | 6/1998 | Erickson |

(Continued)

FOREIGN PATENT DOCUMENTS

WO    WO 01/86392    11/2001

OTHER PUBLICATIONS

International Search Report from PCT/US02/41403, dated Apr. 25, 2003.

*Primary Examiner* — Shanto M Abedin
(74) *Attorney, Agent, or Firm* — Louis J. Hoffman; William E. Markov

(57) ABSTRACT

Personal Digital Server ("PDS") is a unique computer application for the storage, updating, management and sharing of all types of digital media files, including audio, video, images and documents, irrespective of their format. PDS provides users with a single location to store and access, both locally and remotely, all of their digital media. It also provides the user total control of the overall management of these assets.

10 Claims, 7 Drawing Sheets

(56) References Cited

U.S. PATENT DOCUMENTS

| | | | |
|---|---|---|---|
| 6,041,357 A | 3/2000 | Kunzelman et al. | |
| 6,055,637 A | 4/2000 | Hudson et al. | |
| 6,247,130 B1 | 6/2001 | Fritsch | |
| 6,477,644 B1 | 11/2002 | Turunen | |
| 6,640,097 B2 | 10/2003 | Corrigan et al. | |
| 6,718,328 B1 | 4/2004 | Norris | |
| 6,742,028 B1* | 5/2004 | Wang | G06F 17/30209 707/999.01 |
| 6,898,636 B1 | 5/2005 | Adams et al. | |
| 7,028,033 B2 | 4/2006 | Brighl et al. | |
| 7,039,806 B1 | 5/2006 | Friedman et al. | |
| 7,046,269 B2 | 5/2006 | Parker et al. | |
| 7,058,720 B1* | 6/2006 | Majidimehr | H04L 29/06027 709/217 |
| 7,216,156 B2 | 5/2007 | Chatani | |
| 7,401,235 B2 | 7/2008 | Mowers et al. | |
| 7,426,574 B2 | 9/2008 | Liao | |
| 7,440,953 B2 | 10/2008 | Sidman | |
| 7,475,246 B1 | 1/2009 | Moskowitz et al. | |
| 2002/0013763 A1 | 1/2002 | Harris | |
| 2002/0062336 A1* | 5/2002 | Teodosiu | H04L 29/06 709/201 |
| 2002/0078361 A1 | 6/2002 | Giroux et al. | |
| 2002/0087887 A1 | 7/2002 | Busam et al. | |
| 2002/0091792 A1* | 7/2002 | Janniello | H04L 12/1854 709/217 |
| 2002/0107968 A1 | 8/2002 | Horn et al. | |
| 2002/0107982 A1* | 8/2002 | Teodosiu | H04L 29/12066 709/245 |
| 2002/0120577 A1 | 8/2002 | Hans et al. | |
| 2002/0120607 A1 | 8/2002 | Price et al. | |
| 2002/0138471 A1* | 9/2002 | Dutta | G06F 17/30867 |
| 2002/0143791 A1 | 10/2002 | Levanon et al. | |
| 2002/0152214 A1* | 10/2002 | Muntz | G06F 17/30067 |
| 2002/0157002 A1* | 10/2002 | Messerges | G06F 21/10 713/155 |
| 2002/0178261 A1* | 11/2002 | Chang | H04L 29/06 709/225 |
| 2002/0184158 A1 | 12/2002 | Tadayon et al. | |
| 2003/0004885 A1 | 1/2003 | Banerjee et al. | |
| 2003/0009518 A1* | 1/2003 | Harrow | H04L 47/10 709/203 |
| 2003/0014630 A1 | 1/2003 | Spencer et al. | |
| 2003/0014759 A1* | 1/2003 | Van Stam | G06F 17/30029 725/97 |
| 2003/0051156 A1 | 3/2003 | Razdan et al. | |
| 2003/0093401 A1 | 5/2003 | Czajkowski et al. | |
| 2003/0115283 A1* | 6/2003 | Barbir | H04L 29/06 709/217 |
| 2003/0126211 A1 | 7/2003 | Anttila et al. | |
| 2003/0163702 A1* | 8/2003 | Vigue | G06F 17/30206 713/176 |
| 2003/0196107 A1 | 10/2003 | Robertson et al. | |
| 2003/0217163 A1 | 11/2003 | Lagerweij et al. | |
| 2003/0236820 A1 | 12/2003 | Tierney et al. | |
| 2004/0093273 A1 | 5/2004 | Laurent et al. | |
| 2004/0148523 A1 | 7/2004 | Lambert | |
| 2006/0150257 A1 | 7/2006 | Leung et al. | |

\* cited by examiner

PERSONAL DIGITAL SERVER (PDS)

BENEFIT CLAIMS TO RELATED APPLICATIONS

This application is a division of application Ser. No. 12/709,933, filed Feb. 22, 2010, which is a division of application Ser. No. 10/499,793, filed Nov. 15, 2004, which is a National Stage Entry of PCT/US02/41403, filed Dec. 24, 2002, which claims priority of provisional application Ser. No. 60/344,066, filed Dec. 28, 2001, the disclosures of which are hereby incorporated by reference.

FIELD OF THE INVENTION

The present invention relates to telecommunications, and in particular to management, distribution and sharing of digital media files.

BACKGROUND INFORMATION

With the advances of computer information systems, individuals and businesses around the world have collected a wide variety of content on their computers, including music files, digital photographs and various types of documents including word processing documents and spreadsheets. One of the primary needs of computer users is the ability to share such content with other users because of affinity, friendship, and business relationships. Although there are other computer systems that allow sharing of content, there does not currently exist a comprehensive system to manage a wide variety of content from initial organization through sharing. Moreover, none of the existing systems ensure satisfactory digital rights management and are thus increasingly prone to legal challenges.

SUMMARY OF THE INVENTION

The present invention is a unique computer application ("PDS") for the storage, updating, management and sharing of all types of digital media files, "including audio", video, images and documents, irrespective of their format. PDS provides users with a single location to store and access all of their digital media. It also provides the user total control of the overall management of these assets. This level of user control is unparalleled in the marketplace today.

PDS enables a content owner (an "Owner") to share his or her digital media catalog with a limited group (a "Peer Group") of permitted users ("Peers") over a peer-to-peer network that requires only limited interaction with a central server. The sharing of Owner's audio and video files is limited to streaming them to one Peer (or another pre-set limited number of Peers) at a time and, optionally, without an opportunity for the Peer to download, permanently store or make copies of the files, and is thus copyright-friendly. PDS makes digital content accessible from any Internet-enabled electronic device, e.g., desktop and portable computers, PDA and web-enabled cellular telephones. PDS allows each Owner to monitor and control the use of his or her digital catalog, including the ability to see which Peers are accessing particular files and to cancel their access at any time. The system also allows an Owner to expose or grant access to files on Owner's computer without having to move files to a special place and without exposing any of the characteristics of the folder or directory structure of Owner's computer. This access method is keyed to the visitor's email address and enables secure trusted communications without exposing passwords or requiring a complex setup.

PDS users will also benefit from a proprietary User Interface designed specifically for the new ways in which personal digital media can be managed via the storage server. In addition to its core technology, PDS may include the following "add-on" features:

Music: organizer, playback (by multiple simultaneous users via any Internet enabled device), play lists, detailed artist/album information, recommendations, downloads, purchase, CD creation & management of portable MP3 players.

Photos: organizer, storage for thousands of photos, display with zoom, printing (to low-cost photo quality printers), auto-upload from digital cameras.

Internet Radio: organizer, access to thousands of stations, time based recording and playback, download to portable players.

Home Video: organizer, storage of home videos, playback (by multiple simultaneous user via any Internet enabled device).

Books: organizer, storage for hundreds of audio or eBooks, playback (by multiple simultaneous users via any Internet enabled device), download to portable players.

Document Library: organizer, storage for thousands of files, upload, download, auto PC backup.

Third-Party Delivery: music downloads, photo processing, documents.

PDS' core technology utilizes several components that can be categorized as follows: (1) authentication and authorization of Peers, (2) "real-time" detection and sorting of a Peer's digital files, (3) indexing of digital files and exchange of such indices among the Peer Group, (4) searching for auxiliary content, (5) remote access to digital content, (6) restricting access to copyrighted media, (7) intelligent bandwidth management and (8) information system and architecture for a peer-to-peer network. Each of these components is detailed below.

DETAILED DESCRIPTION OF THE INVENTION

1. Authentication and Authorization of Users. (a) Simplicity—Using E-mail Addresses to Verify User Authorization. PDS includes a very simple e-mail address based system for an Owner to authorize others to access Owner's media. To provide access to a given user (a "Guest"), the Owner simply enters the Guest's email address. PDS then sends an e-mail "Invitation" to the Guest. If the Guest has never registered with the PDS central server, the Guest is directed to set up a PDS master account on the PDS central server by submitting a valid e-mail address and a password of their own creation. This registration only needs to occur once, and the Guest is then enabled, though not authorized, to access any PDS-networked/enabled device.

Figure 1:
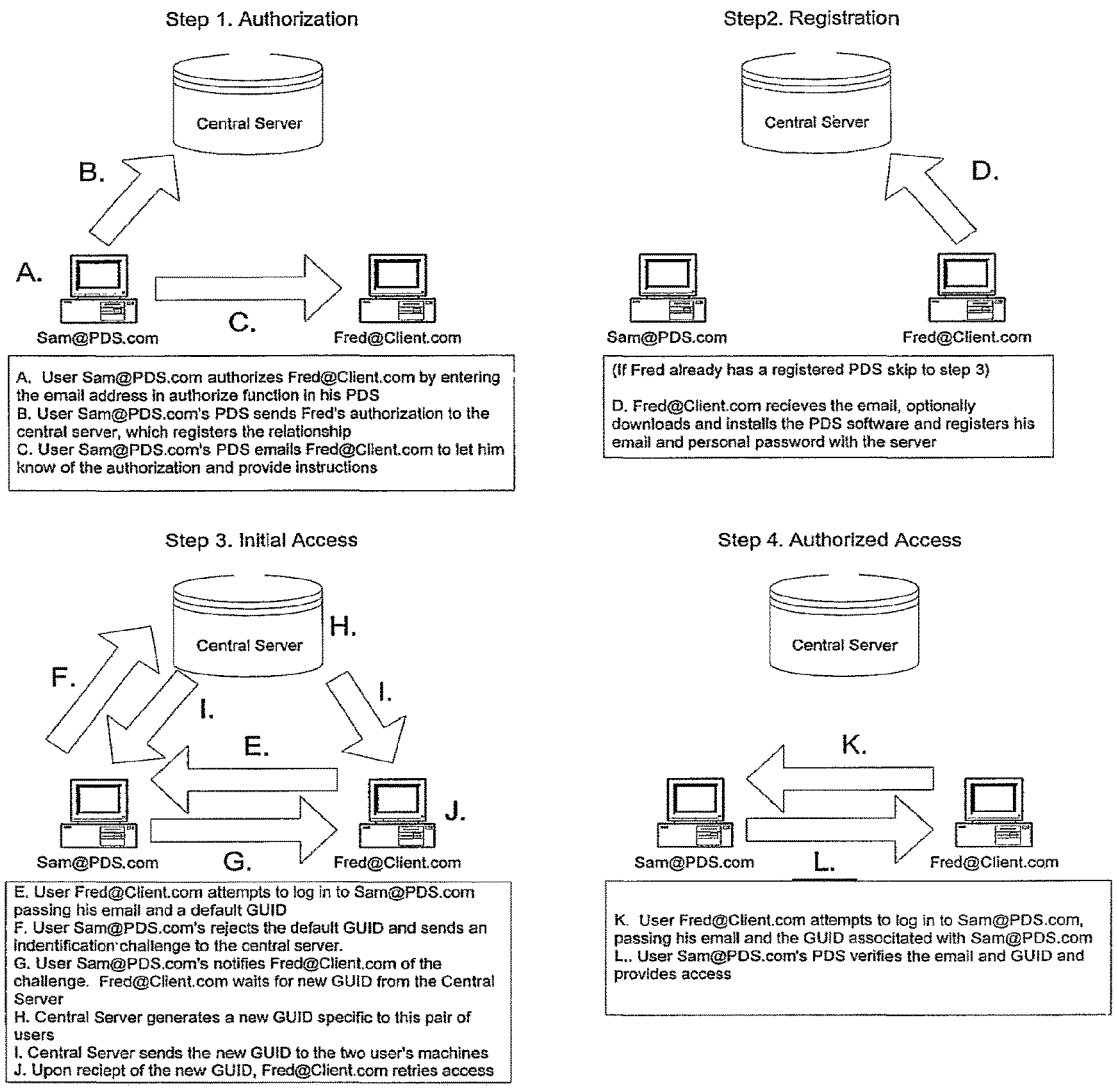
FIG. 1 is a flow diagram of the authentication and authorization processes.

(b) Security—Using GUID at the Peer-to-Peer Level. When the Guest tries to access the Owner's PDS to which the Guest had been invited, the Owner's PDS requests a global unique identifier ("GUID") that applies only to transactions between this particular pair of users (i.e., the Owner and the Guest). This GUID is used in place of the Guest's password, so that the Owner's PDS never needs to see or store the Guest's password. If the Owner's PDS is not supplied with the correct GUID from the Guest, it issues a challenge and requests that the PDS central server authenticate the Guest. This initiates a process illustrated in FIG. 1, whereby the PDS central server authenticates the Guest and generates a new "GUID" which is then supplied to both the Owner's PDS and the Guest. The Guest is now authorized to access the Owner's PDS. Thus, for example, if a user (the "Requesting User") wishes to listen to a song stored by a Peer (the "Providing User"), the Requesting User's computer (or another access device) needs to transmit the correct e-mail addresses and the corresponding GUID. This method avoids sharing passwords among users of the system, thus providing privacy to the Requesting User and also eliminating the occurrence of "cascading" breaches (where an intruder who breaks into the hard drive of one user can steal the passwords of all of such user's Peers and therefore defeat the security on each successive degree of separation). The GUID-based authentication system (as opposed to password-exchange alternatives) also helps prevent a Requesting User from caching or downloading streamed audio and video files, thereby making PDS copyright-friendly. It additionally allows a Guest to create his or her own password that works across an unlimited number of unconnected devices without ever passing the Guest's password to those devices.

(c) Fault Tolerance and Scale—Limited Need for a Central Server. GUID-based authentication substantially reduces the burden on the PDS central server. The central server needs to be involved only the first time the Requesting User's access device contacts the Providing User. All subsequent communications or transactions can occur on a direct Peer-to-Peer basis by using the GUID. This vastly improves the fault tolerance and scalability of the PDS network, as new users and devices can be added without exerting significant additional strain on the central server.

2. File Detection. After installing the software, the PDS file detection algorithm scans all of the user's drives and directories with the exception of system and temporary directories, detects and identifies media files and organizes them by type, regardless of the application that created, updated or stored them. This operation takes several minutes, as opposed to the half-hour or more required by the existing algorithms. The reason it is quicker is that it initially identifies metadata by parsing the filename, instead of reading the imbedded tags within the MP3, WMA and associated files. Filenames can be parsed effectively, because many storage applications utilize standardized nomenclature. For example, the names of audio files typically include the artist, album and track titles, and the file type. Existing file detection algorithms look at the filename to detect the file type, but identify the media content itself by searching for imbedded tags within the file. PDS, on the other hand, looks at the filename to detect both the file type and identify the media content. Only if the filename does not contain the metadata, PDS would look for imbedded tags within the file.

While a user's PDS is running, the algorithm intermittently scans the hard drive whenever the user's computer is idle, i.e., is not performing other, memory consuming functions. During the initial data collection, the algorithm compiles a table of directories where it finds media files. At each subsequent scan, the algorithm looks at these directories first, and when a file changes in a directory, that directory is automatically rescanned, and the listing of its contents is updated. This "background" scanning is incremental, i.e., it only detects files that have been added to the user's computer since the previous scan, and therefore takes mere seconds. Another distinguishing feature of this algorithm is that it searches locations where new files might be stored in the decreasing order of likelihood: it first looks at the most logical place other applications store media files, then proceeds to look in the least likely places. This methodology conserves search time and the operating memory of the user's computer.

Figure 2:
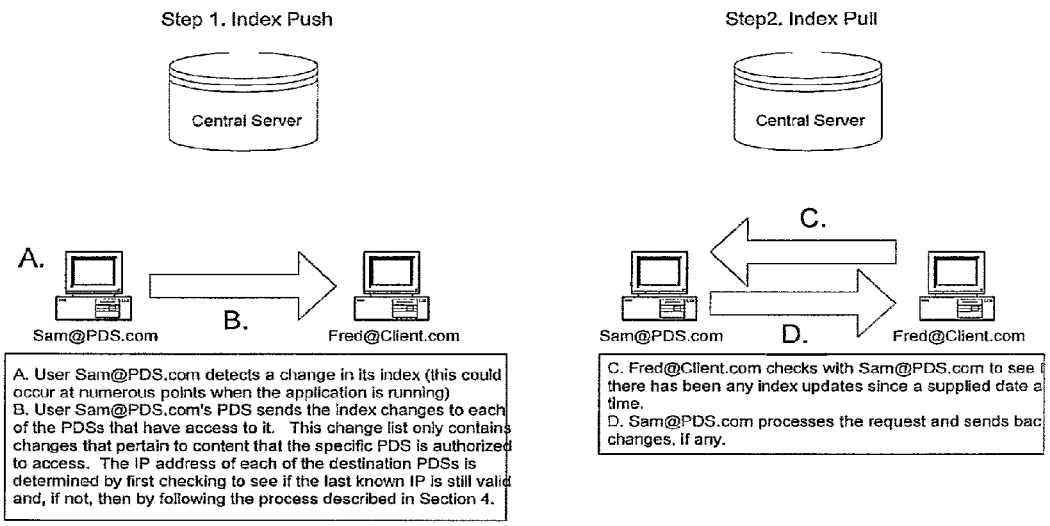
FIG. 2 is a flow diagram of the index update and exchange processes.

3. Index Updates and Exchange; Content Distribution. After PDS scans a user's hard drive for digital media content, it organizes the new content by file type and creates or updates an index of the content. The user's PDS then sends a copy of the updated index to each of its other Peer Group members, utilizing the GUID authentication algorithm described in paragraph 1 above. This operation is performed intermittently and upon detection of new content, throughout the period of time the user is logged on the PDS network. The advantage of such index exchange is that Peers are not required to search the entirety of each other's hard drives to find a particular file—instead, they search each other's indices which are continuously updated. This again conserves time and operating memory. Importantly, neither the users' digital media content nor their indices are copied onto the central server, which makes the network much more scalable and less prone to be overloaded and malfunction. The updates are user specific, so that the Peers only receive indexes that list content that they are authorized to access. Additionally, the distributed indexes allow users to review the index of content stored even on those devices which are not turned on. FIG. 2 illustrates an index update and exchange algorithm according to the present invention.

Figure 3:
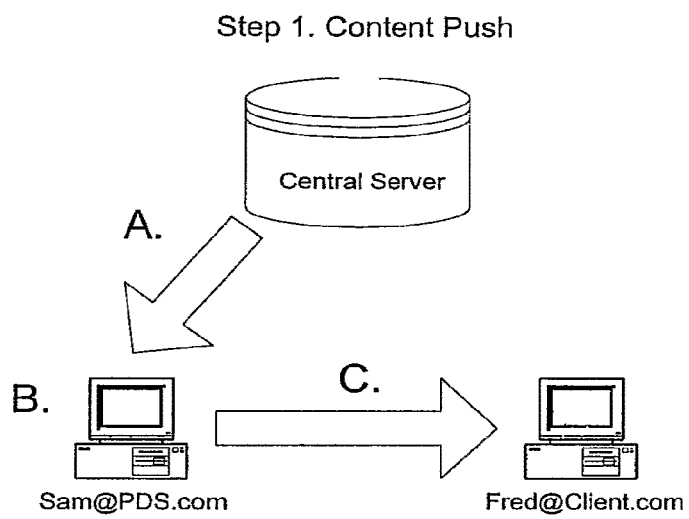
FIG. 3 is a flow diagram of the global content distribution process.

The technology involved in index exchange also enables (but does not require) distribution of content from the PDS central server. Thus, it is very easy and convenient to send software upgrades, promotional messages and media files to the users of the network. FIG. 3 illustrates a variation of the index-exchange algorithm that enables such network-wide content distribution.

Figure 4:
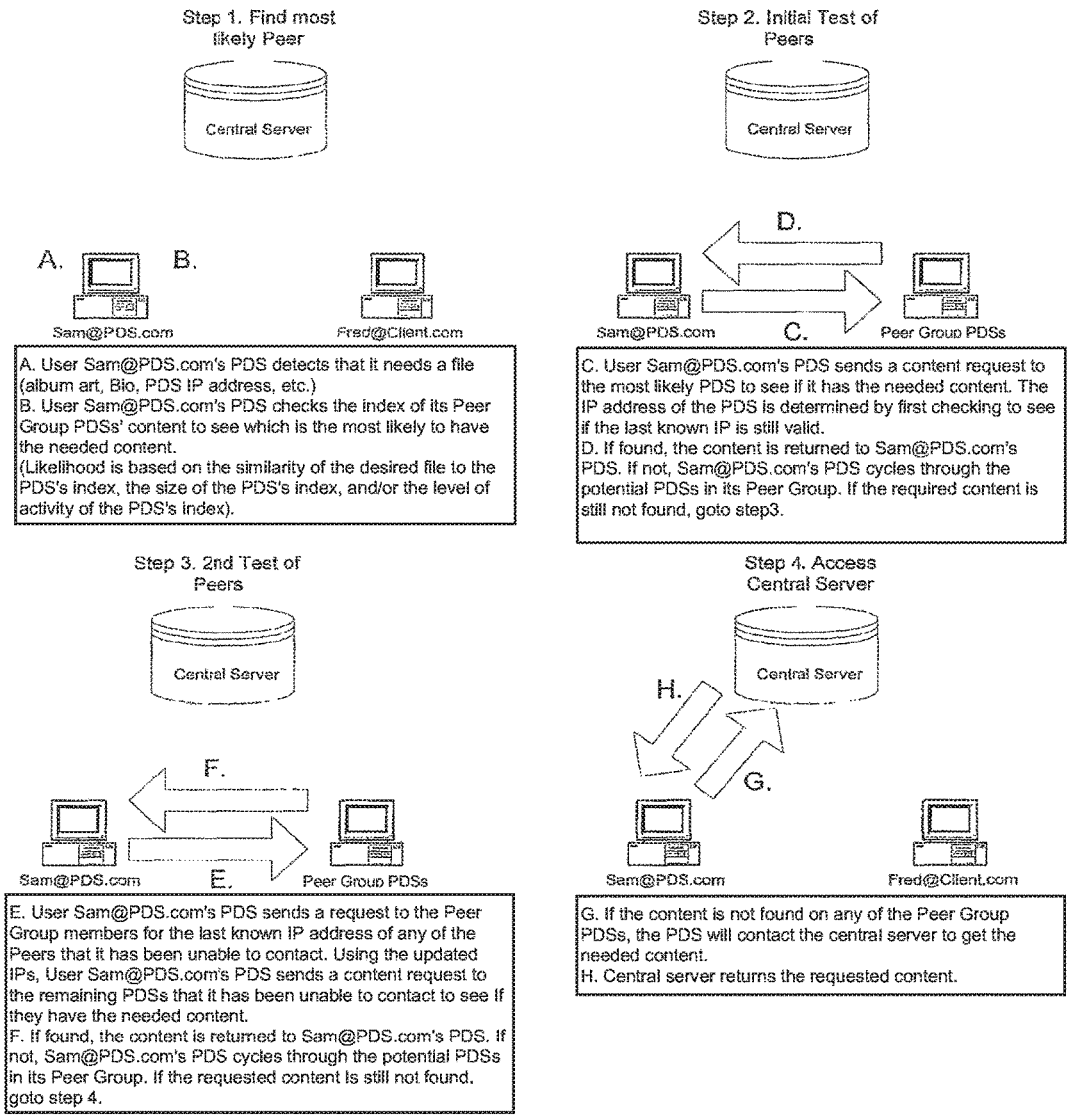
FIG. 4 is a flow diagram of the search algorithm.

4. Searching for Auxiliary Content. The central server may contain certain information of general interest about particular media files stored on a user's hard drive, for example, a database of music titles, cover art and artists' biographies. A user requesting a particular title from a Peer might want to access and download such information. The PDS content search algorithm is unique in that it will begin searching for the requested information at the less likely source, i.e., on the Peers' hard drives, and will turn to the most likely source—the central server—only if none of the active Peers have the information. This method significantly reduces search time and the overloading of the central server. This new method of programming—moving from less reliable sources of information to the most reliable source—can be applied in many applications where network-wide speed and conservation of resources is more important than immediate reliability. FIG. 4 illustrates an algorithm for this search function:

Step 1. Find most likely Peer

A. User Sam@PDS.com's PDS detects that it needs a file (album art, Bio, PDS IP address, etc.).

B. User Sam@PDS.com's PDS checks the index of its Peer Group PDSs' content to see which is the most likely to have the needed content. Likelihood is based on the similarity of the desired file to the PDS's index, the size of the PDS's index and/or the level of activity of the PDS's index.

Step 2. Initial Test of Peers

C. User Sam@PDS.com's PDS sends a content request to the most likely PDS to see if it has the needed content. The IP address of the PDS is determined by first checking to see if the last known IP is still valid.

D. If found, the content is returned to Sam@PDS.com's PDS. If not, Sam@PDS.com's PDS cycles through the potential PDSs in its Peer Group. If the required content is still not found, goto step 3.

Step 3. 2nd Test of Peers

E. User Sam@PDS.com's PDS sends a request to the Peer Group members for the last known IP address of any of the Peers that it has been unable to contact. Using the updated IPs, user Sam@PDS.com's PDS sends a content request to the remaining PDSs that it has been unable to contact to see if they have the needed content.

F. If found, the content is returned to Sam@PDS.com's PDS. If not, Sam@PDS.com's PDS cycles through the potential PDSs in its Peer Group. If the requested content is still not found, goto step 4.

Step 4. Access Central Server

G. If the content is not found on any of the Peer Group PDSs, the PDS will contact the central server to get the needed content.

H. Central server returns the requested content.

Remote File Access. There are currently two general types of remote-access applications that allow users' to access their own (and each other's) files across various Internet-enabled devices, neither of which matches the remote-access capabilities of PDS. The first type includes applications which depend on replicating the home computer's graphical desktop environment on the remote-access device. This method does not work well for access devices which either are not built for a graphical desktop environment or use a smaller screen resolution, such as PDA and cell phones. It also requires a high-speed Internet connection and does not work well in a multi-user setting, due to its limited ability to control access at the file level. The second type of remote-access applications, such as access based on the FTP protocol or facilitated by a web-server, depends on the ability of the remote device to browse the home computer's file directories. It is prohibitively complex to integrate the functions of authorization of users and files into applications of this type. It also poses issues in that the users must know what the content is named and where the content is located on the host. Instead, PDS' remote access feature utilizes a method of publishing a view of the content (formatted in XML if relevant to include) that is user specific (only the content that specific user is authorized to see) and able to include enhanced meta data (logically organized and containing descriptions/labels more meaningful than simply file names). This view is able to be easily formatted to any device as it requires neither the replication of the desktop environment, nor the browsing of file directories. This enables PDS users to access and or share their own media files (e.g., listen to music and view videos) remotely in a contextually relevant, simple and reliable manner regardless of the type of access device.

6. Restricted File Access. PDS ensures copyright-friendly music and video file sharing by (a) preventing the recipient of streamed audio and video files from saving, copying, caching or downloading them and (b) blocking others from accessing the file while it is being streamed. This approach electronically replicates the lending of copyrighted works in the physical world of books, tapes and CDs. There currently does not exist a system for peer-to-peer sharing of digital media, which limits the sharing of media to a one-on-one experience, such that, for example, a single song from a CD is played to only one person (or another pre-set number of simultaneous users) at any one time. PDS creates a vehicle for the sharing of music (and/or video) with reasonable limitations on the User, whereby music is not spread unintentionally or intentionally beyond the single play of one song for one user (or another pre-set number of simultaneous users) at a time. The PDS system further limits the sharing of music (and/or video) to closely-related users, such as friends or business associates.

Other systems that are capable of preventing access to a content stream do so by authorizing access to particular groups of content, with the number of simultaneous users limited only by the resources of the system's central server, not by software design as in the case of PDS. Additionally, these other systems do not block access to the underlying media file itself; the file may thus be used by several applications at the same time, creating a possibility of copyright infringement. PDS is more protective of copyright owners in that it blocks the streamed file from being accessed by any other user or application. The PDS approach also allows for treating different types of media files differently, i.e., access need not be restricted for personal photographs and documents, where copyright infringement is unlikely. In addition, each Owner can customize levels of access to such Owner's digital catalog using several parameters, e.g., identity of a Peer, file type and individual file name. The Owner can also limit the length of time a Peer can access a file, as well as specify the type of access the Peer is granted, e.g. playing, viewing or borrowing. The Owner can terminate or change the level of a Peer's access at any time. Finally, the system can be used for streaming real-time content, as well as sharing downloaded content utilizing. Digital Rights Management techniques. Below is the technical description of the PDS file-access restriction method:

File "borrowing" can be implemented by streaming or by having the Requesting User make a copy of the file. Streaming has the advantage of allowing the Requesting User to immediately render the file via the stream. Streaming requires that the Requesting User have an Internet connection to the Owner's PDS device for the duration of the streaming. Copying, on the other hand, has the advantage of allowing the Requesting User to render the file at a later time without being connected to the Owner's PDS device. The examples below outline the methods of streaming and copying by one Peer at a time; however, the PDS software is configurable to limit the streaming and copying to two or any other number of Peers at a time.

A. Method for Peer-to-Peer File "Borrowing" via Streaming:
  1. The PDS software running on a Requesting User's access device maintains an index of all media files. The index also contains metadata for each media file, including information about who currently has borrowed the file, when they borrowed the file, and for how long they borrowed the file.

2. When the Requesting User attempts to stream a media file, the system first determines (by reading the metadata about the file from the index) if the file is already "borrowed" by another Peer. If so, it rejects the request. Otherwise, it will update the metadata for the file in the index, lock the file from use by other applications and allow the Requesting User access to the stream.

3. The stream is encrypted in a way which will only allow it be "rendered" by the Requesting User while being streamed from the Owner's PDS device. This prohibits the Requesting User from making a "copy" of the stream for later playback or viewing.

B. Method for Peer-to-Peer File "Borrowing" via Copying the File:

1. The PDS software running on a Requesting User's access device maintains an index of all media files. The index also contains metadata for each media file including information about who currently has borrowed the file, when they borrowed the file, and for how long they borrowed the file.

2. When the Requesting User attempts to copy a media file, the system first determines (by reading the metadata about the file from the index) if the file is already "borrowed" by another Peer. If so, it rejects the request. Otherwise, it will update the metadata for the file in the index to reflect that the Requesting User has borrowed the file and lock the file from use by other applications.

3. The system encrypts the file, adding encrypted metadata to the beginning of the file marking who the Owner is, who the Requesting User is, and when the "borrowing" will expire. A copy of the encrypted file is then transferred to the Requesting User's machine.

4. The software will restrict the Owner of the file from rendering the file in any way until the expiration date and time of the "borrowing" has been reached.

5. The software will allow the Requesting User to render the file up until the time the expiration has been reached.

Figure 5:
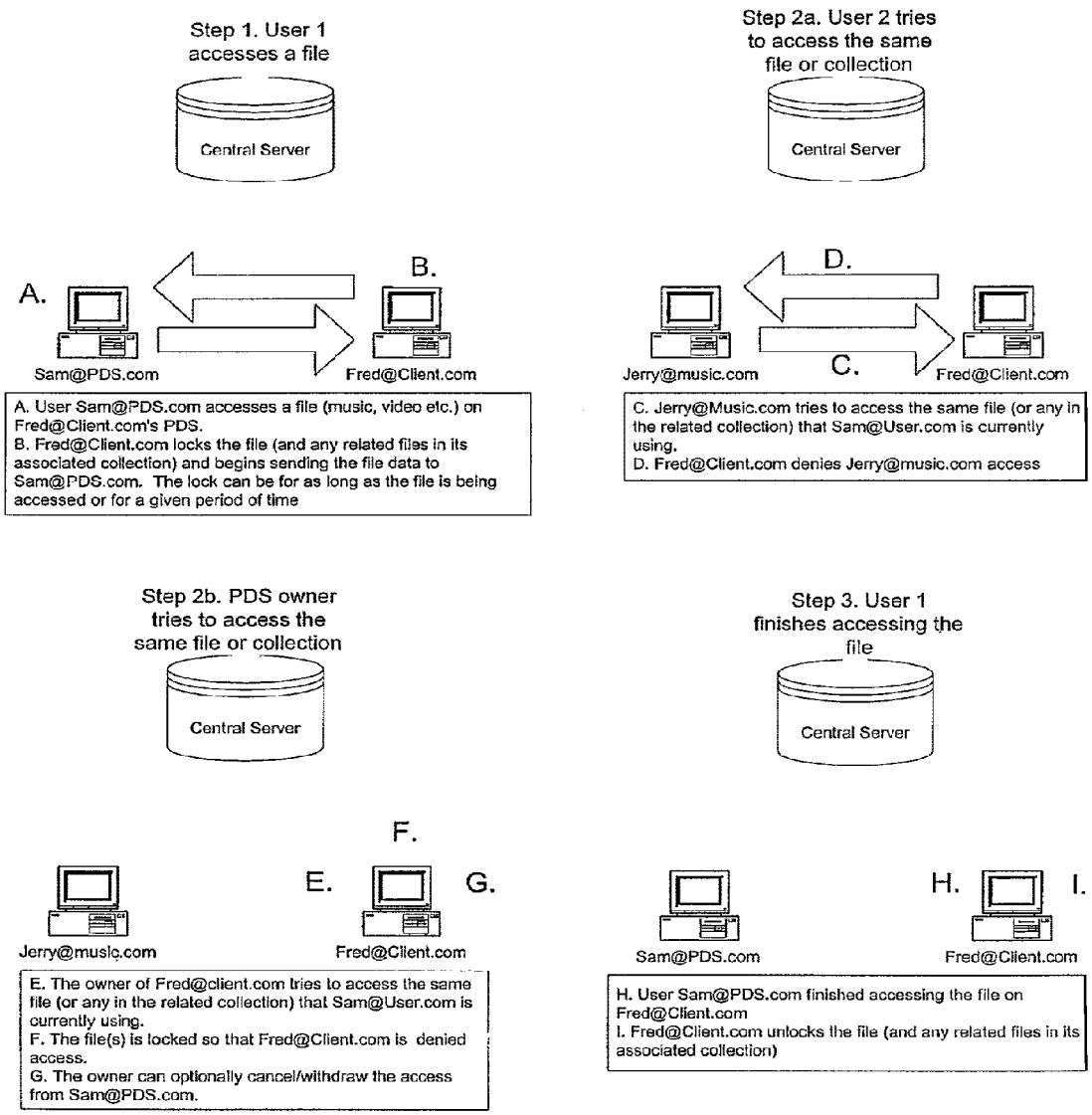
FIG. 5 is a flow diagram of the file lending process.

FIG. 5 illustrates an exemplary flow of events among three peers, showing restricted access to media files according the present invention.

Figure 6:
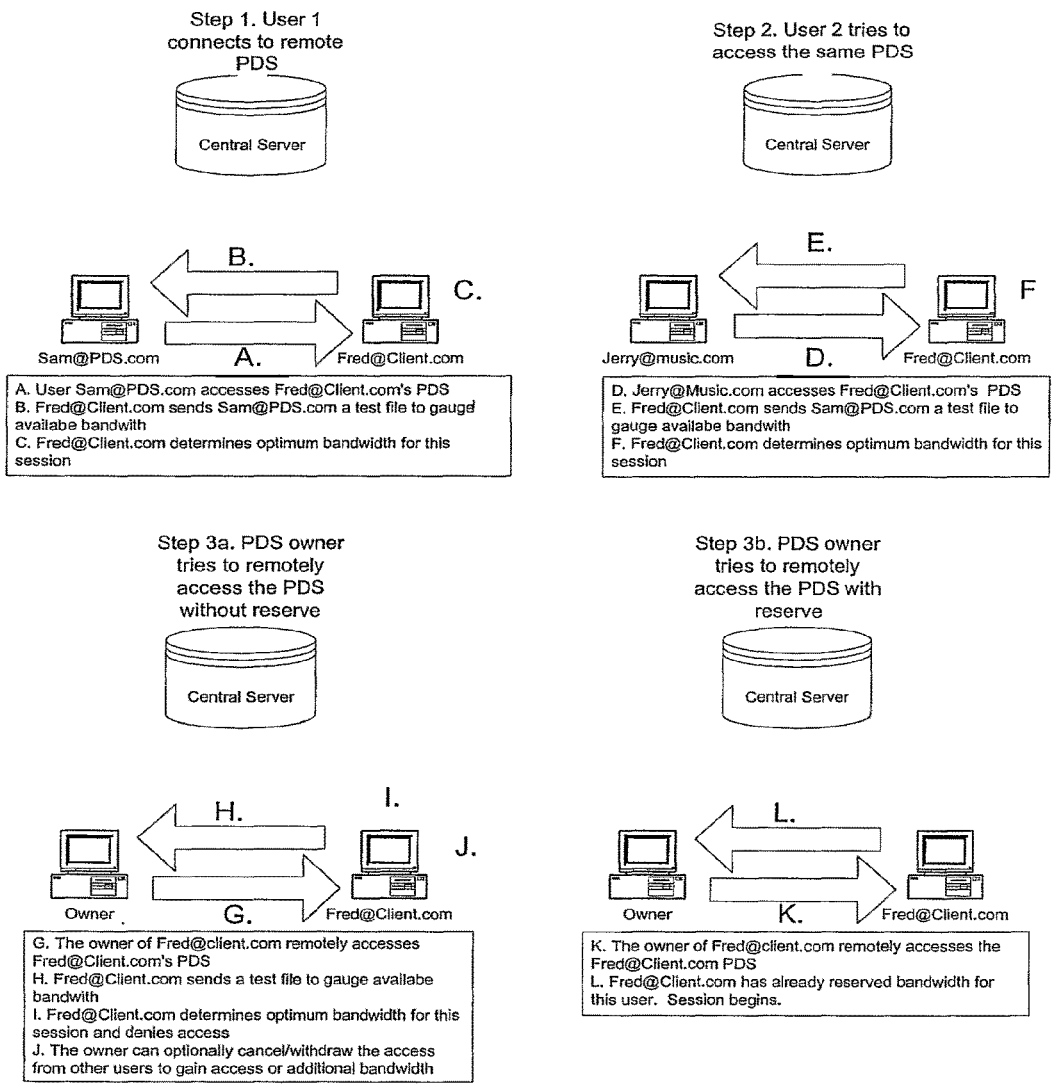
FIG. 6 is a flow diagram of the bandwidth allocation algorithm.

7. Bandwidth Management. PDS utilizes a novel approach to bandwidth management by monitoring and streaming from a Providing User's PDS device and restricting access when that device is at or near the peak of its overall bandwidth capacity. This provides a better user experience, reduces the delay in file access and facilitates more even allocation of Peer Group resources. The system also allows for reserving a "guaranteed" amount of bandwidth (and thus a "guaranteed" level of access) for certain users or groups of users. FIG. 6 illustrates a bandwidth management algorithm according to the present invention.

Figure 7:
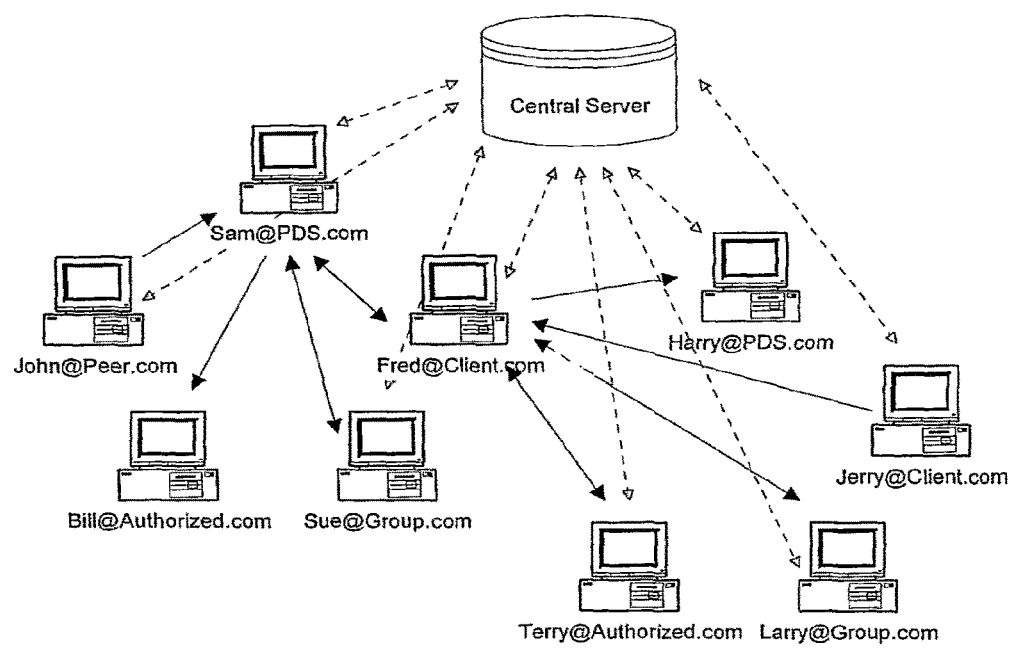
FIG. 7 is an illustration of the PDS system architecture.

8. An Information System and Architecture for a Peer-to-Peer Network. Most computer network systems on the Global Computer Network rely on a central node or "super node" for the co-ordination, organization and management of their related users and the sharing of information and content. There currently does not exist a system for peer-to-peer access and the sharing of content among users, which does not rely on the continuous use of a central device. The PDS peer-to-peer network described herein only relies on the central server for initial setup, fail over, and addition and authorization of new users and devices. An exemplary peer-to-peer network is schematically illustrated in FIG. 7. The system's design provides for the direct secure communication among the networked devices without the involvement of a central server. Each PDS device contains the required information that allows it to directly communicate with and update all of the other PDS devices within its Peer Group. This self-reliance of individual nodes provides the system with:

Ability to directly and securely request and implement peer-to-peer content sharing and transfer A scalable system not limited by amount of content or number of devices in the network Ability to securely request information from Peers regarding another Peer without accessing a central server and without disclosing the Peer's password.

Ability to self-configure and maintain network connections without the involvement of a central server.

What is claimed:

1. A computerized method for a first user's computer, designated the requestor computer, to find content among a plurality of computers of users and a central server computer responsible for authorizing the users to participate in a peer-to-peer sharing service accessible to the plurality of computers, comprising:

automatically with the requestor computer:

(a) requesting the content from each of the plurality of computers using a respective first IP address to communicate with each of the plurality of computers;

(b) requesting, from each computer with which the requestor is able to establish communications, an updated IP address for a computer for which the requestor computer is unable to establish communication using that computer's first IP address;

(c) using the updated IP address received from at least one of the computers to request the content from the computer for which the requestor computer is unable to establish communication using the computer's first IP address; and then (d) if and only if the content is not found on any of the plurality of computers, requesting the content from the central server computer; and (e) responding to a request from one of the plurality of computers for additional content.

2. The method of claim 1 further comprising receiving the content from a remote one of the computers, which remote computer contains an application programmed to reformat the content before transmitting the content, and automatically restoring the format of the content to its original form upon receipt.

3. The method of claim 1 wherein requesting in part (a) is performed in decreasing order of likelihood that respective of the computers possess the content.

4. The method of claim 1 further comprising receiving the content from a remote one of the computers, which remote computer contains an application programmed to packetize the content before transmitting the content, and automatically assembling and restoring the format of the content to its original form upon receipt.

5. A first user's computer, designated the requestor computer, for finding content among a plurality of computers of users and a central server computer responsible for authorizing the users to participate in a peer-to-peer sharing service accessible to the plurality of computers, the requestor computer programmed:

(a) to request the content from each of the plurality of computers using a respective first IP address to communicate with each of the plurality of computers;

(b) to request, from each computer with which the requestor is able to establish communications, an updated IP address for a computer for which the requestor computer is unable to establish communication using that computer's first IP address;

(c) to use the updated IP address received from at least one of the computers to request the content from the computer for which the requestor computer is unable to establish communication using the computer's first IP address; and then (d) if and only if the content is not found on any of the plurality of computers, to request the content from the central server computer; and (e) to respond to a request from one of the plurality of computers for additional content.

6. The requestor computer of claim 5 wherein the requestor computer is programmed to receive the content from a remote one of the computers, which remote computer contains an application programmed to reformat the content before transmitting the content, and to automatically restore the format of the content to its original form upon receipt.

7. The requestor computer of claim 5 the wherein requestor computer is programmed to perform the request in part (a) in decreasing order of likelihood that respective of the computers possess the content.

8. The requestor computer of claim 5 the wherein requestor computer is programmed to receive the content from a remote one of the computers, which remote computer contains an application programmed to packetize the content before transmitting the content, and automatically assemble the content upon receipt.

9. A computer-readable non-transitory storage medium storing a set of computer instructions for finding content among a plurality of computers of users and a central server computer responsible for authorizing the users to participate in a peer-to-peer sharing service accessible to the plurality of computers, wherein the set of computer instructions, when executed on a first user's computer, designated the requestor computer, causes the requestor computer, automatically:

(a) to request the content from each of the plurality of computers using a respective first IP address to communicate with each of the plurality of computers;

(b) to request, from each computer with which the requestor is able to establish communications, an updated IP address for a computer for which the requestor computer is unable to establish communication using that computer's first IP address;

(c) to use the updated IP address received from at least one of the computers to request the content from the computer for which the requestor computer is unable to establish communication using the computer's first IP address; and then (d) if and only if the content is not found on any of the plurality of computers, to request the content from the central server computer; and (e) to respond to a request from one of the plurality of computers for additional content.

10. The computer-readable storage medium of claim 9 wherein the set of computer instructions, when executed on the requestor computer, causes the requestor computer to perform the request in part (a) in decreasing order of likelihood that respective of the computers possess the content.

* * * * *